United States Patent [19]
Larson

[11] 3,745,684
[45] July 17, 1973

[54] FISHING APPARATUS
[76] Inventor: Carl T. Larson, One Kearing St., San Francisco, Calif. 94108
[22] Filed: Jan. 5, 1970
[21] Appl. No.: 665

Related U.S. Application Data
[63] Continuation-in-part of Ser. No. 779,690, Nov. 29, 1968, abandoned.

[52] U.S. Cl.................... 43/24, 43/25, 242/84.2 D, A01k/87/04
[51] Int. Cl. .................... A01k 89/00, A01k 89/04
[58] Field of Search.................... 43/24, 25; 242/84.2 D

[56] References Cited
UNITED STATES PATENTS
| 2,866,291 | 12/1958 | Duell | 242/84.2 D X |
| 1,258,804 | 3/1918 | Otto et al. | 43/24 |
| 3,370,806 | 2/1968 | Odom | 242/84.2 D |

FOREIGN PATENTS OR APPLICATIONS
| 859,236 | 6/1940 | France | 242/84.2 D |
| 951,192 | 4/1949 | France | 242/84.2 D |
| 20,609 | 1902 | Great Britain | 43/24 |

Primary Examiner—Robert W. Michell
Assistant Examiner—George M. Yahwak
Attorney—Townsend & Townsend

[57] ABSTRACT

Fishing apparatus for casting and reeling in a fishing line wherein a reel having means for mounting the same on a rod is provided with structure permitting a fishing line to be removed from the reel in twirls or convolutions during a cast and as the reel remains stationary on the rod. The convolutions move substantially upwardly from the reel to a location spaced above the latter, following which the line moves forwardly in the intended direction of cast. After the cast, the structure permits the line to be directed head-on to the reel to permit reeling in of the line. The reel is mounted with its central axis passing through the rod so that control of the convolutions during a cast can be achieved. The structure includes a member extending transversely of the forward direction of the cast, the member having a transverse dimension related to the diameter of the reel.

15 Claims, 12 Drawing Figures

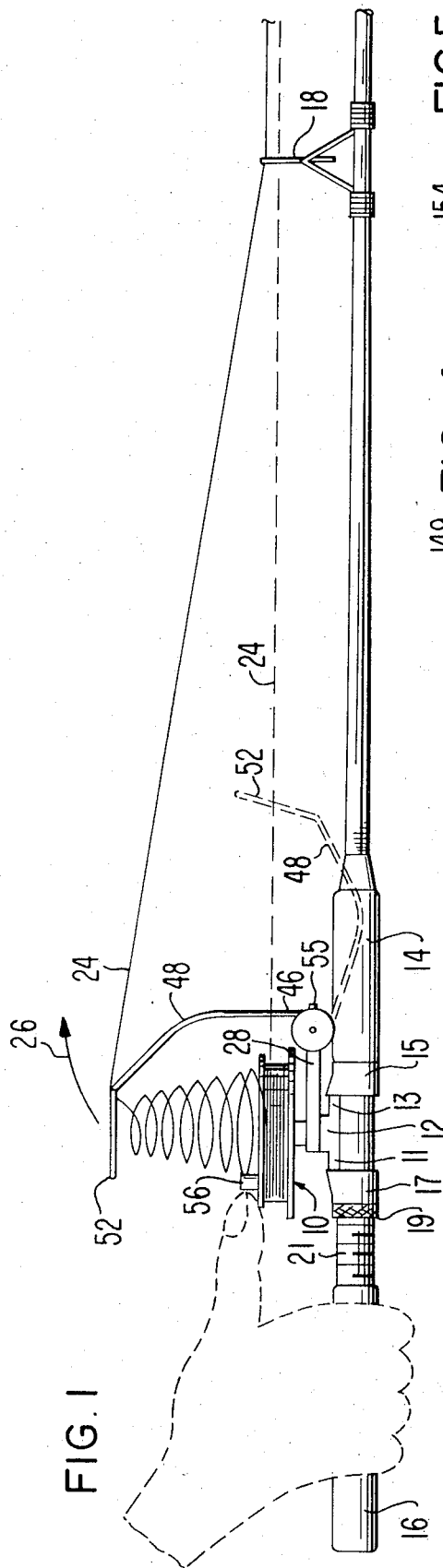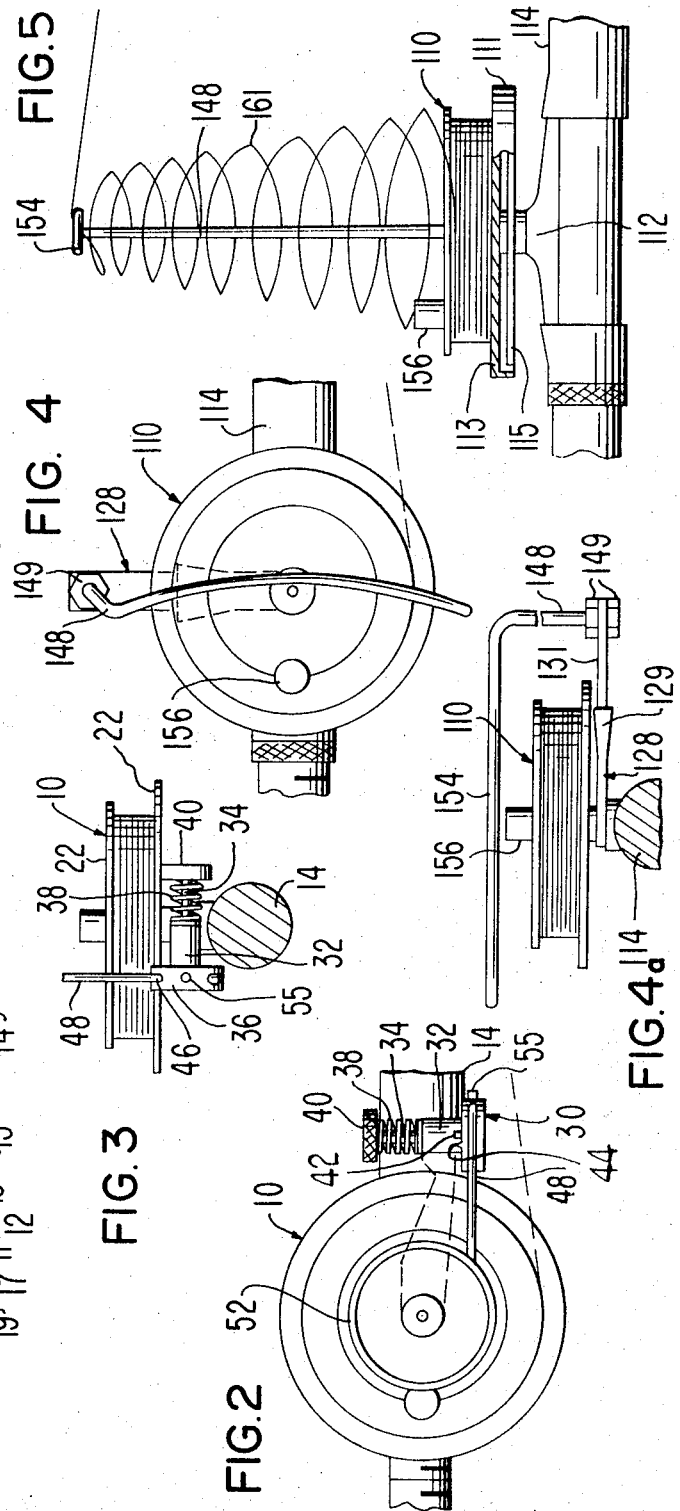

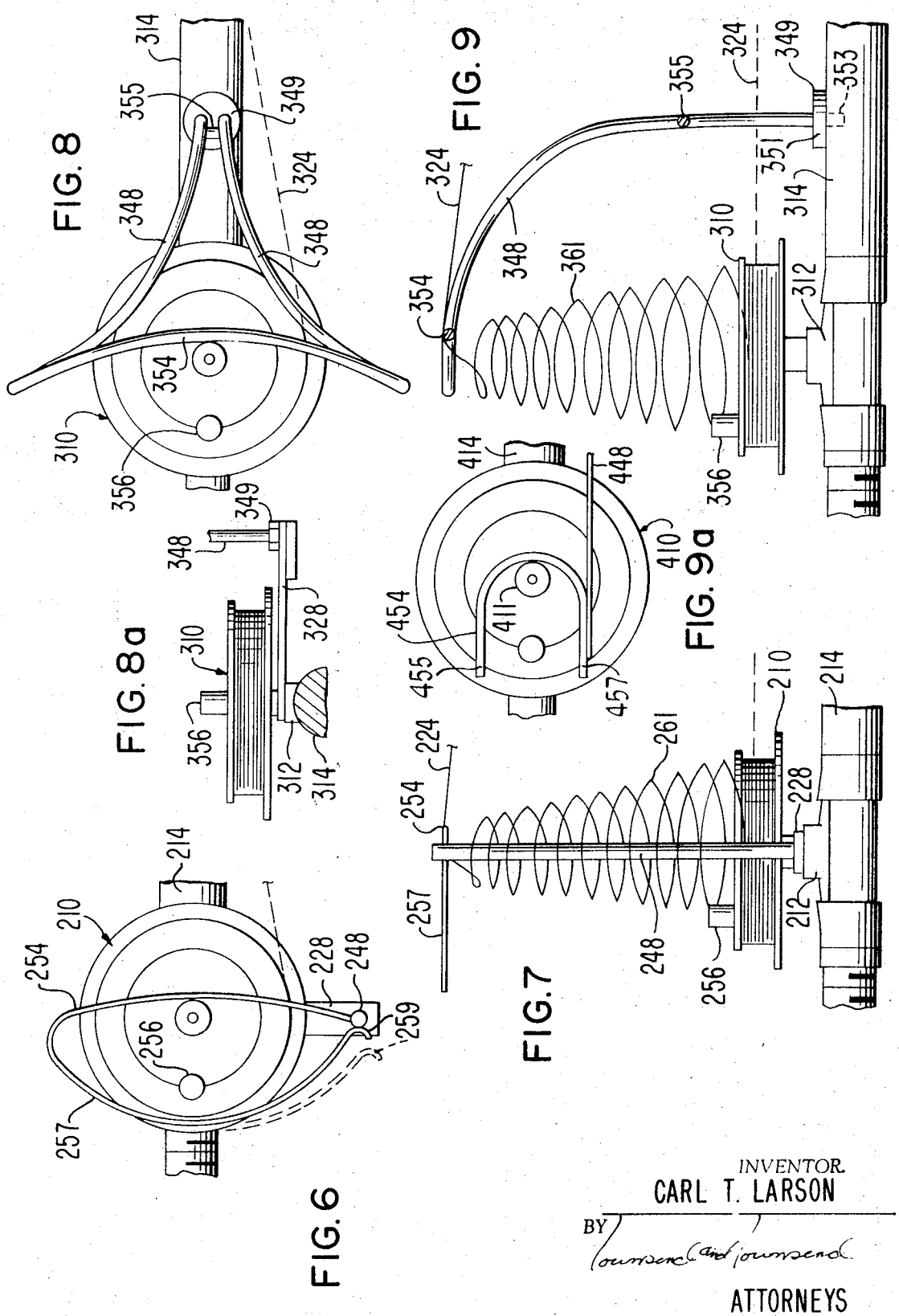

FISHING APPARATUS

This is a continuation-in-part application of copending application Ser. No. 779,690 filed Nov. 29, 1968, now abandoned for Fishing Apparatus.

This invention relates to improvements in fishing gear and, more particularly, to fishing apparatus for use in casting a fishing line.

The fishing apparatus of this invention is comprised of a combination of elements which permits a fishing line to be cast outwardly from a reel in a manner such that the distance of the cast is relatively much greater than that achieved with most conventional fishing reels. The apparatus provides a highly efficient means of casting a line outwardly yet the line is returned directly onto the reel without the need for bales, gears or other structure and without setting any substantial twist in the line.

Almost all fishermen, in using rods and reels for casting, desire that the line be cast out from the reel as far as possible so that a wide range of casting distances can be realized. This feature permits a fisherman to cast his line in many obscure locations and increases the enjoyment and participation in the sport. In general, conventional casting equipment is constructed such that a fishing line can be cast outwardly only through a limited, maximum distance. Many attempts have been made to provide improvements in the equipment to increase the casting distance but, for the most part, such attempts have been unsuccessful.

The present invention is directed to fishing apparatus which provides a significant improvement over conventional equipment by providing structure allowing a fishing line to move off a reel during a cast in such a manner that the fishing line is cast outwardly from the reel through a distance relatively much greater than is capable with the use of conventional casting equipment. To this end, the apparatus of this invention utilizes a fishing reel on which a fishing line is wound and a line-engaging member spaced outwardly from the reel to alter the direction of movement of the line during a cast after the line has moved off the reel in twirls or convolutions. The line-engaging member can be a circular loop or an open bail. The convolutions of the line move toward the line-engaging member while the reel remains stationary on the rod to which it is connected. Moreover, the reel is mounted on the rod in a manner such that the central axis of the reel passes through the rod so that the thumb of the user can control the line as it is moved off the reel in convolutions while grasping the rod immediately rearwardly of the reel. Also, the placement of the reel and the line-engaging member with respect to the rod allows the line to move upwardly and forwardly during a cast, the line moving essentially in the direction of the cast by virtue of the projection of the line upwardly as it moves off the reel during the cast. In this way, lateral movement of the line is avoided to thereby avoid the developments of a twist in the line as the latter moves laterally off the reel and then forwardly.

Preferably, the line-engaging member will be in the form of an open bail, whereby the line can be most readily placed on and taken off the member. To this end, the bail has at least one free end to permit manipulation of the line onto and off the bail. Under certain casting conditions, it may be advantageous to use a circular loop as the line-engaging member. For instance, in windy weather, the circular loop provides good control of the line during a cast. To provide for different or changing casting conditions, the apparatus of this invention is constructed to permit easy interchangability of line-engaging members. Thus, when a line-engaging member of a certain shape and size is being used when the wind velocity and direction changes, it may be found advisable to change to a line-engaging member of a different size and/or shape.

While the convolutions of the line generally decrease in diameter as the line-engaging member is approached, the diameters of the outermost convolutions are still sufficiently large to present a line snarling problem as a circular loop of relatively small size is used as the line-engaging member. In such a case, the line overruns the loop and becomes wrapped around the loop and/or its mounting means. To circumvent this problem, it has been found that the minimum transverse dimension of a circular loop must be approximately one-half the effective diameter of the reel to avoid frequent snarling of the line on the loop. If an open bale is used, this minimum transverse dimension can be less without encountering the snarling problem. When the line becomes entangled on the line-entangling member during a cast, the line cannot effectively move forwardly of the member any further. The reason for this entanglement of the line on a circular loop is believed to be due to the fact that the outermost convolution of the line, if they are equal to or larger in diameter than the loop, will overrun and wrap about the loop and/or its mounting means in such a manner during a cast to snarl and become entangled on the loop and/or its mount so as to inhibit further movement of the line forwardly of the loop.

The apparatus of the present invention is to be distinguished from that shown in British Pat. No. 20,609 A.D. 1902 issued to Thomas Cowburn, because the latter reference shows a fishing line removed from a reel in a lateral direction of cast rather than in an upward and forward direction of cast. Moreover, the reference shows a line-engaging element which has a transverse dimension much smaller than one-half the diameter of the reel associated with it. This dimension is of the order of one-sixth the effective diameter. Tests have been conducted with structure made in accordance with the teachings of the Cowburn patent and it has been found that a fishing line, during casts, will very frequently become snarled on the line-engaging element to the extent that the outward movement of the fishing line from the reel is effectively halted so as to substantially limit the distance through which the line can be cast.

Another disadvantage with the structure of Cowburn is that the reel is mounted on a rod so that its axis of rotation is spaced from the rod rather than passing through the rod as is the case with the reel of the present invention. Such placement of the reel prevents effective control of the line as it moves off the reel since the thumb cannot properly engage the reel during a cast while the hand grasps and manipulates the rod to complete the cast.

Still a further disadvantage of the structure of the Cowburn patent is that the line is removed from the reel in a lateral direction during a cast before the line moves forwardly so that the line is twisted each time a cast is made. This twist becomes accumulative over a number of casts and the net effect is that the line becomes difficult to reel in and cast out and must be untwisted to achieve the desired result, namely, maximum casting distance. Because of the presence of such twists in the line, the line-engaging member spaced outwardly from the reel, because of its relatively small transverse dimension with respect to the diameter of the reel, causes the line to more quickly become snarled on the member so that, eventually, the apparatus becomes almost completely inoperable for its intended purpose.

The present invention overcomes the problems mentioned above with respect to the Cowburn patent while providing structure for use in casting a line through a relatively long distance. The essence of the invention is the way in which the line is removed from the reel during the cast and the way in which the line can be oriented so that it can be reeled in and onto the reel itself. In particular, the line is removed from the reel during a cast in twirls or convolutions and the line engaging member and its mount are constructed in a manner so as not to interfere with the convolutions to thereby avoid snarling of the line on the member or the mount. The line moves upwardly and forwardly of the reel during a cast so that, in effect, the line is projected forwardly to eliminate the twist in the line due to a lateral movement as is required with the use of the Cowburn structure. The reel remains substantially stationary on the rod during a cast. In this way, the invention has the advantages of a spinning reel inasmuch as there is no inertia effects of the reel to overcome during the cast.

After a cast has been made, the apparatus of the invention permits the positioning of the fishing line so that it makes a straight-in or head-on approach to the reel. Thus, the reel can be rotated in a direction to permit the line to be wound thereon. The line can be reeled in directly onto the reel without the need for a bail of the type used on a conventional spinning reel.

Since the line comes directly to the reel, the simplest of reels can be used so that any tendency to break the line, such as by a fish pulling on the line, is minimum due to the minimal inertia effects of the reel. Also, a simple reel allows the user to keep his thumb on the line or outer periphery of the reel rather than setting a drag on the reel for controlling the amount of line which is reeled out from the reel. The present invention thereby provides greater reel and line control. Also, a simple reel used with the invention may have a relatively large effective radius so that the lever arm is greater than that of a conventional casting reel to permit the reel to be more easily rotated. This minimizes any tendency for the reel to break if a fish hits the line and pulls it out from the reel.

In conventional spinning or casting equipment, the fishing line at all times generally extends outwardly from the reel in the forward direction of travel of the line longitudinally of the rod to which the reel is connected. During a cast with a spinning reel, the line comes off the reel forwardly thereof in convolutions as the reel remains stationary. After the cast, the bail is needed to control the line during reel-in. The bail engages the line and directs it around the non-rotating reel which generally uses gears and other mechanical linkages which provide the inertia for the bail. Such reels are not as simple in construction as a basic reel used with a fly rod, the latter reel being essentially a rotating spool connected directly to a spindle to avoid the use of gears.

Fly reels, being as simple as they are, are essentially trouble-free and are less likely to cause a line to break if, for instance, a fish were to hit the line and begin to pull it outwardly from the reel. The reason for this is that there is minimum inertia to overcome in commencing the rotation of the reel.

The present invention utilizes the advantages of both the spinning reel and the fly reel in that it allows the line to come off the reel in twirls or convolutions as in a spinning reel, yet allows for a straight-in approach to the reel as in a fly reel. This invention is, therefore, simple in construction and efficient in operation.

The apparatus of this invention utilizes a mounting extension for positioning the line-engaging member in outwardly spaced relationship to the reel. The extension can be carried by an arm secured to the mounting means on the reel or can be attached to the rod directly. Also, the extension can be removably disposed on the arm or the rod to permit interchangeability of line-engaging members. When using a circular loop, the arm is mounted for movement from a first position with the loop disposed above the reel to a second position with the loop disposed forwardly of the reel to permit the loop to form a line guide for a straight-in approach of the line to the reel. In using an open bail, the line can be manually placed on the bail immediately prior to a cast and manually removed the the bail immediately after a cast. Also, the extension for the bail can be removably mounted on an arm connected to the mounting means of the reel or can be mounted on the rod itself so that the bail can be completely removed from the reel after a cast has been made or can permit interchangeability.

The primary object of this invention is to provide improved fishing apparatus for casting a fishing line wherein the line is moved off a reel in twirls or convolutions as the reel remains stationary on a rod with the line moving about a line-engaging member spaced outwardly from the reel so that the line moves upwardly and forwardly from the reel during the cast so as to be effectively projected from the reel to eliminate any twisting in the line yet allowing the line to be cast outwardly through a relatively long distance due to the twirling of the line off the stationary reel.

Another object of this invention is to provide apparatus of the type described wherein the line, after a cast, can be moved so that it extends substantially forwardly of the reel to allow for a straight-in approach thereto when it is desired to reel in the line prior to making another cast.

A further object of this invention is to provide apparatus of the aforesaid character wherein the reel is mounted so that its central axis passes through the rod to allow thumb control of the line as it leaves the reel in convolutions during a cast yet permits thumb control of the reel after a cast has been made while permitting the rod to be grasped immediately rearwardly of the reel.

Still another object of this invention is to provide fishing apparatus of the type described wherein the line-engaging member is constructed to permit a cast to be made without snarling of the line on the member to thereby assure that the maximum casting distance can be realized for each cast of the line.

A further object of this invention is to provide fishing apparatus of the type described wherein the line-engaging member is removably mounted adjacent to the reel to permit interchangeability between line-engaging members to suit different casting conditions.

Other objects of this invention will become apparent as the following specification progresses, reference being had to the accompanying drawings for illustrations of several embodiments of the invention.

In the drawings:

FIG. 1 is a fragmentary, side elevational view of a fishing rod having the reel and a circular loop of this invention mounted thereon and illustrating the way in which a fishing line is moved off the reel during a cast;

FIG. 2 is an enlarged, fragmentary, top plan view of the reel and loop of FIG. 1;

FIG. 3 is a cross-sectional view looking rearwardly toward the reel mounted on the rod;

FIG. 4 is a fragmentary, top plan view of a second embodiment of the apparatus showing an open bail as the line-engaging member;

FIG. 4a is a view looking toward the rear of the rod in the direction of the reel of FIG. 4;

FIG. 5 is a side elevational view of the reel and line-engaging member of FIG. 4;

FIG. 6 is a top plan view, similar to FIG. 4, of a third embodiment of the apparatus, showing an open bail having a rear guard therefor;

FIG. 7 is a view similar to FIG. 5 but relating to the embodiment of FIG. 6;

FIG. 8 is a top plan view of a fourth embodiment of the apparatus having an open bail, FIG. 8a is a side elevational view of a different type of mounting for the bail of FIG. 8;

FIG. 9 is a side elevational view of the embodiment of FIG. 8; and

FIG. 9a is a fragmentary, top plan view of a fifth embodiment, showing an open bail having depth.

The first embodiment of the invention is illustrated in FIGS. 1-3 and includes a reel 10 having a mount 12 for mounting the same in a conventional manner on a rod 14 of the type having a handle 16 and a number of line guides 18 secured thereto at spaced locations along its length. Reel 10 is of a simple, rugged construction in that it is spool-like and provided with a pair of opposed flanges 20 and 22 between which is wound a fishing line 24. Mount 12 is located so that it can fit lengthwise along the rod and so that it can mount reel 10 with the central axis of the reel passing through the rod as shown in FIGS. 2 and 3. Thus, when the reel is gripped at handle 16 and cast forwardly in the direction of arrow 26, the line can move off reel 10 in an upward direction in twirls or convolutions in a manner to be described.

An arm 28 is secured to and extends forwardly from mount 12 as shown in FIG. 1. At the forward end of arm 28 is a retainer 30 including a sleeve 32 rigid to arm 28 and disposed transversely thereof. A shaft 34 is shiftably received within sleeve 32 and carries a disk-shaped member 36 at one end thereof. A coil spring 38 surrounds shaft 34 at the end of sleeve 32 opposite to member 36. A stop 40 is mounted on the opposite end of shaft 34 whereby the spring biases member 36 into engagement with the sleeve, the latter being provided with one or more indentations 42 for receiving a projection 44 on member 36.

Member 36 has a bore therethrough for receiving one end 46 of an extension 48 which normally extends upwardly from member 36, the upper end of extension 48 being rigid, the outer periphery of a circular loop 52 which defines a line-engaging member. A set screw 55 releasably secures the lower end extension 48 in the bore of member 36. Line 24, in position for casting, extends upwardly from the reel and passes through loop 52 and then extends forwardly of the loop and passes through the various line guides 18 on rod 14.

Extension 48 is movable from the full line position of FIG. 1 to the dashed line position thereof by forcing member 36 to the left when viewing FIG. 3 and then rotating shaft 34 until loop 52 is in the dashed line of FIG. 1, at which position loop 52 can serve as a line guide for a straight-in or head-on approach to reel 10, the line being shown in dashed lines in FIG. 1 for this straight-in approach.

In use, handle 16 is grasped by the fingers of the hand so that the thumb can control the reel and the line as shown in FIG. 1. The user places a weight on the outer end of the line after the latter has been threaded through loop 52 and the various line guides 18.

By swinging the rod backward in a vertical arc and then swinging the rod forwardly in such vertical arc in the direction of arrow 26, the line will be moved off the reel in an upward direction and then forwardly after passing loop 52. The loop, therefore, acts as a device which redirects the lines from its upward movement to direct, forward movement through the line guides of the rod.

During the time the line moves off the reel, it traverses the distance between the reel and loop 52 in a series of twirls or convolutions in the manner shown in FIG. 1. These convolutions generally decrease in diameter as the loop is approached and, because the uppermost convolution generally will have a relative large diameter, loop 52 must have a minimum transverse dimension to accommodate the uppermost convolutions and prevent it from snarling on the loop. If this loop is substantially below this minimum value, there will be a snarl of the line about the loop and about the extension which supports the loop. The line thus becomes entangled so that further forward progress of the line is almost completely prevented. This effect has been shown to be true for fishing apparatus of the type disclosed and illustrated in the British Pat. No. 20,609 issued to Cowburn as mentioned above.

Another important feature is that extension 48 is shaped to be out of traversing relationship with the convolutions as they move upwardly toward loop 52 during a cast. The arm of Cowburn which supports the loop is in a position to interfere with the movement of convolutions during the time the convolutions move and before a complete stoppage of the line occurs. Thus, it is believed that the arm of Cowburn contributes to the entanglement of the loop at the end of the arm. This problem is avoided by shaping extension 48 in the manner shown in FIGS. 1-3, wherein the arm is, for the most part, spaced a relatively large distance away from the region through which the convolutions pass.

Since the reel is mounted so that its axis passes through the rod, complete control of the reel and line can be achieved at all times since the user then easily places his thumb on the reel or in the path of the twirling line so as to control the twirling action and thereby the outward distance of a cast. The reel remains stationary during a cast since the line comes off the reel in convolutions; however, after a cast has been made, thumb action on the reel controls the tension in the line and also controls the amount by which the line is pulled outwardly from the reel when a fish is hooked on the outer end of the line.

During the outward cast, the rod is moved in a vertical arc as mentioned above so as to effectively project the line upwardly and forwardly in a continuous movement. When so projected, the line moves straight outwardly without undergoing a twist so that a number of casts can be made without having to untwist the line. In contrast to this, the Cowburn line moves laterally during the movement of the rod in a vertical arc so that a twist is placed on the line of Cowburn which progressively increases over several casts, eventually necessitating the untwisting of the line after a relatively few casts in order to continue casting.

After a cast has been made, the user moves extension 48 into the dashed line position whereby loop 52 becomes a line guide. The line can then be reeled in onto the reel by rotating the reel about its axis in a clockwise sense when viewing FIG. 2. A handle 56 on reel 10 facilitates the rotation thereof. The line makes a straight-in or head-on approach to the reel and does not require the need of bales or other structure for feeding the line onto the reel.

The foregoing has been described with respect to the use of a weight on the outer end of the line, the size of the weight being of any desired value but, for purposes of illustration, it may be approximately 2 ounces. Larger weights placed on the line will permit the line to be cast through a greater distance.

Among its other features, the apparatus of this invention is suitable for use in fly fishing wherein only the weight of the line itself is relied upon the carry the lure on the end of the line outwardly. Thus, no stripping of the line is necessary as is the case with conventional fly fishing equipment and a very light bale can be used with a lightweight reel to achieve an almost perfect fly cast.

Loop 52, as shown in FIG. 2, has a diameter or transverse dimension slightly greater than one-half the effective diameter of the reel. As mentioned above, the minimum transverse dimension of loop 52, which in essence is its diameter, must be approximately one-half the effective diameter of the reel to prevent snarling or entangling of the line on the loop and arm 48. The diameter of loop 52 can be larger than one-half the effective diameter of the reel and larger loops may well be recommended for use by fishermen who are not as proficient in casting as are others, or who find casting conditions such that a larger diameter loop appears to be called for.

A second embodiment of the apparatus of this invention is shown in FIGS. 4, 4a and 5. In this embodiment, a reel 110 has a mount 112 for attachment to a rod 114 in a conventional manner. Reel 110 is substantially the same in construction as reel 10 and is adapted to receive a fishing line in wrapped relationship thereon. The reel is mounted so that its central axis passes through rod 114 as shown in FIGS. 4 and 4a. Thus, the line can be moved upwardly from the reel and forwardly in substantially the same manner as that described above with respect to FIG. 1. Also, the placement of the reel on the rod assures thumb control of the reel and the line at all times.

An arm 128 is coupled to mount 112 and extends to the side of the same as shown in FIGS. 4 and 4a. Arm 128 has a first tubular segment 129 provided with a polygonal cross-section and a second segment complementally and removably received within segment 129. Segments 129 and 131 are frictionally interconnected so that the same form a unit; however, segment 131 can be pulled away from segment 129 to separate the segments.

An upright extension 148 is secured and extends upwardly from the outer end of segment 131. A line-engaging member 154 is rigid with extension 148 at its upper end. Member 154 is in the form of an open, arcuate bail having a free end remote from the end connected to extension 148. Bail 154 extends across reel 110 and above the same such that the bail is in vertical alignment with the region immediately forwardly of the central axis of the reel as shown in FIG. 4. Also, the length of bail 154 is greater than the effective diameter of the reel. The free end of the bail permits a fishing line to be placed over the bail immediately before a cast and taken off the bail immediately after a cast. When a fishing line 124 is placed over bail 154, the line will extend forwardly as shown in FIG. 5. Also, the line will extend upwardly from reel 110 to bail 154.

Another aspect of reel 110 is that it is provided with an annular lip or skirt 111 secured to flange 113 thereof as shown in FIG. 5. A guard plate 115 is rigidly secured to mount 112 and underlies flange 113. Skirt 11 and plate 115 serve to prevent the line from being wound on the shaft of reel 110 immediately beneath flange 113. Thus, the line cannot become lodged or wedged between the flange and its supporting shaft in a manner to stop the rotational movement of the reel. The reel is provided with a handle 156 for rotating the same on its mount when it is desired to reel the line inwardly when the line is in the dashed line position of FIG. 4, i.e., when the line makes a straight-in or head-on approach to the reel.

In use, the line is first placed over bail 154 while the thumb of the user is in engagement with the reel to prevent further unwinding of the line from the reel. The user then swings the rod rearwardly in a vertical arc and then forwardly through the arc to effect a cast and in so doing, allows the line to move off the reel, the latter being non-rotating during the forward movement of the rod during the cast. As the line moves off the reel, it passes to bail 154 in a series of convolutions or twirls 161 which decrease in diameter as the bail is approached. The line moves upwardly from the reel and over and forwardly from the bail in a continuous, smooth motion and the line is effectively projected upwardly and forwardly, rather than laterally and forwardly, during the cast. The bail thus serves as a means for redirecting the upwardly traveling line in a forward direction toward and through the line guides on the rod.

To avoid entanglement of the line with the bail; the open bail must have a minimum transverse dimension which assures that the line will not become snarled on bail 154 or extension 148. This dimension can be less than one-half the reel diameter since the openness of the bail allows free movement of the uppermost convolution. As shown in FIG. 4, the bail has a transverse dimension which is greater than the diameter of the reel and, in many instances of use, such a bail length is to be preferred. Such a bail would be suitable for use by fishermen who are less proficient in casting than others. Those more proficient in casting could cast efficiently with a bail having a transverse dimension less than that shown in FIG. 4.

The location of extension 148 assures that the extension will not interfere with the build-up and the propagation of the convolutions between the reel and the bail. The extension is sufficiently to the side of the reel so as to remain spaced from any convolutions which are so developed. Also, extension 148 could be at any location about reel 110 which would be convenient for supporting open bail 154. Thus, the extension need not be restricted to the location shown in FIG. 4.

Extension 148 and bale 154 may be of any suitable material. Preferably, they are formed of rigid material, such as a suitable metal. Moreover, extension 148 can be removably connected to segment 131 such as by a pair of nuts 149 threaded onto the lower end of extension 148 on opposite sides of extension 148 shown in FIG. 4a. This feature allows this assembly of the apparatus to be easily stored, such as in a tackle box or the like.

A third embodiment of the apparatus is shown in FIGS. 6 and 7 and includes a reel 210 having a mount 212 for securing the reel on a rod 214 in the conventional manner. The reel is mounted so that its central axis passes through rod 214 as shown in FIG. 6 for the same purposes as mentioned above with respect to reels 10 and 110. A line-engaging member 254 is mounted in spaced relationship above reel 210 for redirecting a fishing line 224 which is moved off the reel during a cast. Member 254 is in the form of an arcuate bail which is effectively open even though it has associated with it a rear guard 257. Bail 254 is secured to the upper end 255 of an upright extension 248, the latter being secured in any suitable manner at its lower end to an arm 228 which extends laterally from mount 212 below reel 210 as shown in FIG. 7. The bail is slightly curved as shown in FIG. 6 so that it is in vertical alignment with a region on the reel immediately forwardly of the central axis of the reel.

Guard 257 is curved which is disposed rearwardly of the bail and operates as a loop to releasably retain a fishing line in the space immediately rearwardly of the bail. Guard 257 is formed of resilient material so that it can move from the full line position of FIG. 6 to the dashed line position thereof. Also, the guard has a convex end portion 259 which is shaped to permit a line to be forced into the space immediately rearwardly of the bail and to allow a line to be pulled outwardly and away from such space. The guard yields in the direction of the dashed line position when the line is forced in or forced out of the space.

The line would on reel 210 moves off the reel in twirls or convolutions 261 as the line moves between the reel and bail 254. These convolutions essentially decrease in diameter as the bail is approached and to accommodate the convolutions adjacent to the bail, the bail must have a minimum transverse dimension of approximately one-half the effective diameter of the reel to avoid snarling and entangling of the line on the bale. Thus, during a cast, the line will move in a uniform fashion upwardly and then forwardly so that the line is essentially projected outwardly from the reel, over the bail, and through the line guides of rod 214 for movement outwardly and forwardly of the rod during the cast.

The position of the reel on the rod allows for maximum thumb control of the reel and the line at all times. The thumb can engage the reel at the rearmost extremity thereof when the fingers of the hand grasp the handle of rod 214 rearwardly of the reel. Also, the position of extension 248 is such as not to interfere with the build-up and propagation of convolutions 261 as they move between the reel and the bail. As shown in FIG. 6, extension 248 is sufficiently to the side of the reel so as to be spaced from the zone in which the convolutions move. It can be placed at other locations, if desired.

In use, the line is first moved onto bail 254 by manually forcing the line between end portion 259 and extension 248. The resilience of guard 257 allows the line to be admitted to the loop defined by the bail and the guard. The rod is then swung in a vertical arc so that the line is effectively projected upwardly and forwardly and, in moving upwardly, the line transverses the space between the reel and the bail in the form of convolutions 261 which progressively decrease in diameter as the bail is approached. The line moves over the bale and then forwardly through the line guides of the rod and outwardly from the rod. The distance of the cast will be, to a large extent, determined by the size of the weight on the outer end of the line. However, the line is moved most efficiently outwardly because of the way in which the line is moved off the reel and toward the bail. The reel remains stationary during this time and the line can be controlled by the thumb to also control the amount of line which is cast outwardly of the rod.

After the cast, the line can then be manually pulled outwardly of the space rearwardly of the bail by causing the line to pass between extension 248 and end portion 259 of guard 257. The line then assumes the dashed line position of FIG. 6 wherein the line makes a straight-in or head-on approach to the reel whereby the handle 256 of the reel can be grasped to rotate the reel in a clockwise sense when viewing FIG. 6 to reel in the line.

A fourth embodiment of the invention is shown in FIGS. 8 and 9 and includes a reel 310 having a mount 312 for releasably securing the same to a rod 314 in a conventional manner. Reel 310 is mounted so that its central axis passes through the rod as shown in FIG. 8. Thus, thumb control of the reel and the line wound on the reel can be achieved at all times as the rod is grasped by the hand at a location rearwardly of the reel.

A line-engaging member in the form of an open, arcuate bail 354 is mounted above reel 310 is spaced relationship thereto for redirecting a fishing line moving off the reel so that the line will move forwardly through the line guides of the rod during a cast. To this end, a pair of curved extensions 348 are secured to the outer ends of bail 354 and curve forwardly and downwardly and terminate at a mounting member 349 comprised of a disk 351 and a polygonal insert 353. The insert has a polygonal cross section and is complementally received within a bore in the rod in a press-fit manner so that member 349 and thereby bail 354 are releasably secured to the rod and the insert is prevented from rotating relative to the rod. A brace 355 interconnects extensions 348 to stabilize the same, such extensions and bail 354 being formed from a suitable, generally rigid material such as a metal, plastic or the like. Bail 354 is curved as shown in FIG. 8 and is in vertical alignment with a region of reel 310 immediately forwardly of the central axis thereof. As shown in FIG. 8, the length of bail 354 is approximately one and one-half times the diameter of reel 310 although this length can be shorter if desired since it is an open bail and will permit free movement of the uppermost convolution of the line during a cast. However, the length of the bail must be sufficient to avoid entanglement of the line due to the twirling action thereof as the line moves off the reel and toward the bail. As shown in FIG. 9, the line moves off the reel in the form of a series of convolutions 361 which progressively decrease in diameter as bail 354 is approached. Thus, the bail permits a smooth, uniform upwardly and forwardly movement of the line during a cast so as to permit the line to be moved off the reel in a most efficient manner to obtain maximum, controlled distance and without causing a twist in the line during the cast.

In use, the line is first manually moved rearwardly of either face end of bail 354 and then placed over the bail, following which the rod is swung forwardly in a vertical arc to cause the line to be cast outwardly of the rod. The line moves off reel 310 in the form of convolutions 361 and is essentially projected upwardly and forwardly by virtue of the geometry of the reel and bail combination. During the cast, the line can be controlled by the thumb since the hand engages the rod immediately rearwardly of the reel. Since the direction of movement of the line is upwardly and forwardly, there will be essentially no twist in the line so that a relatively large number of casts can be made without having to untwist the line.

After the cast, the line is moved off the bail and into the dashed line position of FIG. 8, the line being denoted by the numeral 324. Then the reel can be rotated in a clockwise sense when viewing FIG. 8 by grasping handle 356 so as to allow the line to be reeled in and onto reel 310. The line thus makes a straight-in or head-on approach to the reel.

After a cast has been made, it may be desirable to remove bail 354 from its operative position above the reel. In such a case, extensions 348 are grasped and pulled upwardly from the rod, whereupon member 349 is separated from the rod and can be placed in the pocket of the user. Such removal is not necessary to assure free rotation of the reel since extensions 348 are sufficiently forwardly of the reel so as not to interfere with the hand as the reel is rotated. Member 349 can again be placed in an operative position on the rod immediately before a subsequent cast.

FIG. 8a shows the provision of an arm 328 secured to mount 312 of reel 310. Arm 328 is adapted to mount member 349 in lieu of mounting the same on rod 314. To this end, arm 328 has a bore therein which complementally and releasably receives polygonal insert 353. The insert is press-fitted in the bore so that member 349 and bale 354 connected thereto through extensions 348 can be separated from arm 328. The arm will extend forwardly of the reel so that extensions 348 will be sufficiently forwardly of the zone in which convolutions 361 pass so as not to interfere with the convolutions or with the hand during manual rotation of reel 310.

In FIG. 9a another embodiment of an open, arcuate bail is shown. This bail, denoted by the numeral 454 is mounted in spaced relationship above a reel 410, the latter being mounted in a conventional manner on a rod 414 so that the axis of the reel passes through the rod in the same manner as the reel axes of the other embodiments of the invention. Bail 454 presents a line engaging member having at least one free end 455 and having a certain depth in view of the U-shaped configuration thereof. The bail is coupled at its opposite by an extension 448 either to the mounting means for the reel or to the rod itself.

Bail 454 is used in the same manner as bails 154 and 354. Its configuration, especially the configuration defining its depth and its transverse dimension, permits a line to be cast upwardly and forwardly with respect to the reel without causing snarling of the line on the bail or extension 448. The bail is located so that its forward extremity is aligned with a region forwardly of the axis 411 of reel 410.

While the various line engaging members have been shown as being coupled to the mounting means of respective reels, it is clear that means can be provided to couple the bails to a rod. To this end, a suitable clamp or other fastener can be carried at the lower end of the extension which supports a particular bail. Also, such fastening means can permit the extension and thereby the bail to be removably mounted on the rod.

The mounting means for each reel of the various embodiments of the invention include, as shown in FIG. 1, projections 11 and 13 which are received within recesses in sleeves 15 and 17 respectively on the rod. Sleeve 15 is fixed on the rod and sleeve 17 is movable along the length of the rod and is held in a fixed position by a nut 19 threadably mounted on a stretch 21 of the rod.

I claim:

1. Fishing apparatus comprising: a reel having means for mounting the same on a rod for rotation about an axis extending through the rod transversely thereof, said reel adapted to receive a fishing line in wrapped relationship thereon; a line-engaging open bail member having a pair of opposed free ends; and means coupled with one end of of the member and extending therefrom toward the plane of said reel for positioning the member transversely of a rod and in a zone spaced axially outwardly from the reel when the latter is mounted on the rod to permit the line to be removed from the reel in convolutions during a casting operation with the reel, said member having a transverse dimension sufficient to prevent snarling of the line on the member and said positioning means during a casting operation.

2. Fishing apparatus as set forth in claim 1, wherein said member comprises a circular loop having a diameter at least equal to one-half the effective diameter of the reel.

3. Fishing apparatus as set forth in claim 2, wherein said positioning means includes an extension secured to the loop, an arm rigid to and extending outwardly from said mounting means, and retainer structure mounting said extension on said arm for movement from a first location with said loop in said zone to a second location with said loop in a region forwardly of the reel.

4. Fishing apparatus as set forth in claim 2, wherein the plane of said loop is substantially parallel to the plane of said reel, said loop being in substantially coaxial alignment with said reel.

5. Fishing apparatus as set forth in claim 1, wherein said member comprises a bail having a pair of opposed ends, said positioning means including an arm secured to said mounting means and extending laterally therefrom, an extension secured to the outer end of the arm and extending upwardly therefrom, one end of said bail being secured to the upper end of the extension, and an elongated, resilient guard, one end of the guard being secured to the opposite end of the bail and the other end of the guard being disposed adjacent to and being shiftable relative to the upper end of the extension, said guard and said bail defining a line-receiving space, said other end of the guard being movable away from said extension to permit a line to be moved into and out of said space.

6. Fishing apparatus as set forth in claim 5, wherein said bail is arcuate, said other end of the guard having a convex portion engageable with said upper end of the extension.

7. Fishing apparatus as set forth in claim 1, wherein said member comprises a curved bail having a length substantially equal to at least the diameter of the reel.

8. Fishing apparatus as set forth in claim 1, wherein said member includes a bail having a pair of opposed, free ends, said positioning means being secured to said bail intermediate the ends thereof.

9. Fishing apparatus as set forth in claim 8, wherein said bail is arcuate, said positioning means including a pair of extensions secured to and extending forwardly and downwardly from said bail, and a mounting member secured to the lower ends of said extensions, said mounting member having a polygonal insert adapted to be complementally received within a bore adjacent to the reel.

10. Fishing apparatus as set forth in claim 1, wherein is provided a rod, said mounting means being releasably secured to the rod.

11. Fishing apparatus comprising: a reel having means for mounting the same on a rod for rotation about an axis extending through the rod transversely thereof, said reel adapted to receive a fishing line in wrapped relationship thereon; a line-engaging open bail having a free end; an arm secured to and extending laterally from said mounting means; and an extension secured to and extending outwardly from the outer end of the arm, the opposite end of the bail being secured to the outer end of the extension, said arm and said extension being disposed for positioning the bail transversely of a rod and in a zone spaced axially outwardly from the reel when the latter is mounted on the rod to permit the line to be removed from the reel in convolutions during a casting operation with the reel, said bail having a transverse dimension sufficient to prevent snarling of the line on the bail and said extension during a casting operation.

12. Fishing apparatus as set forth in claim 11, wherein said bail has a cylinder portion arcuate and has a central portion in alignment with a region one one side of the axis of rotation of the reel.

13. Fishing apparatus as set forth in claim 12, wherein said bail has a radius of curvature greater than the radius of the reel.

14. Fishing apparatus as set forth in claim 11, wherein said extension is releasably secured to said arm.

15. Fishing apparatus comprising: a reel having means for mounting the same on a rod for rotation about an axis extending through the rod transversely thereof, said reel adapted to receive a fishing line in wrapped relationship thereon; a line-engaging member; and means coupled with the member and carried by the mounting means for positioning the same transversely of a rod and in a zone spaced axially outwardly from the reel when the latter is mounted on the rod to permit the line to be removed from the reel in convolutions during a casting operation with the reel, said member having a transverse dimension sufficient to prevent snarling of the line on the member and said positioning means during a casting operation.

* * * * *